United States Patent [19]

Takahira et al.

[11] Patent Number: 5,036,460
[45] Date of Patent: Jul. 30, 1991

[54] MICROPROCESSOR HAVING MISWRITING PREVENTING FUNCTION

[75] Inventors: Kenichi Takahira; Atsuo Yamaguchi; Shigeru Furuta; Takesi Inoue; Toshiyuki Matsubara; Shuzo Fujioka, all of Itami, Japan

[73] Assignee: Mitsubishi Denki Kabushiki Kaisha, Japan

[21] Appl. No.: 262,805

[22] Filed: Oct. 26, 1988

[30] Foreign Application Priority Data

Jun. 30, 1988 [JP] Japan .................. 63-160745

[51] Int. Cl.⁵ .................. G06F 5/00; G06F 11/00
[52] U.S. Cl. .................. 364/200; 364/900; 371/10.1; 371/51.1; 371/61; 371/62
[58] Field of Search ... 364/200 MS File, 900 MS File; 371/5.1–5.3, 5.5, 16.3, 12.1, 21.4, 61, 62, 10.1, 10.2, 30, 31, 21.3, 51

[56] References Cited

U.S. PATENT DOCUMENTS

| | | | |
|---|---|---|---|
| 4,023,109 | 5/1977 | Shreve | 371/62 |
| 4,392,226 | 7/1983 | Cook | 371/61 |
| 4,535,404 | 8/1985 | Shenk | 364/200 |
| 4,554,461 | 11/1985 | Oho et al. | 371/62 |
| 4,584,684 | 4/1986 | Nagasawa et al. | 364/200 |
| 4,591,782 | 5/1986 | Germer | 365/228 |
| 4,618,953 | 10/1986 | Daniels et al. | 371/62 |
| 4,780,602 | 10/1988 | Kowana et al. | 371/11.1 |
| 4,866,713 | 9/1989 | Worger et al. | 371/16.3 |
| 4,872,168 | 10/1989 | Aadsen et al. | 371/21.3 |
| 4,903,239 | 2/1990 | Akashi | 365/190 |
| 4,912,708 | 3/1990 | Wendt | 371/16.3 |

OTHER PUBLICATIONS

"+5V Single-Power-Source Operated 64K EEPROM with Page-Write and Polling Function" from Nikkei Electronics (Jan. 1984).

"EEPROM On-Chip Single-Chip Microcomputer" extracted from a monthly magazine Hitatchi Hyoron, Jul. 1986 issue.

64K bit CMOS EEPROM "HN58C65" extracted from a monthly magazine entitled Hitachi Hyoron Jul. 1986 issue.

*Primary Examiner*—Allen R. MacDonald
*Assistant Examiner*—Christopher B. Shin
*Attorney, Agent, or Firm*—Leydig, Voit & Mayer

[57] ABSTRACT

A microprocessor system including an EEPROM with a page mode writing function that prevents writing of erroneous data. The circuit includes a memory cell array divided into a plurality of pages each having a predetermined number of bytes, a data latch for latching bytes corresponding to a page, an exterior write control circuit which enables the data latch in response to a signal from the CPU to latch a sequence of bytes corresponding to a page, and an interior write control circuit which enables the memory cell array so that the bytes latched in the data latch are transferred therefrom to a page of the memory cell array. The exterior write control circuit includes a time measurement circuit and an interior write suppression circuit. The time measurement circuit measures the time which elapses from the initiation of the latching of bytes into the data latch, and outputs an overflow signal when the measured time exceeds a predetermined limit. The interior write suppression circuit suppresses the interior write control circuit, in response to the overflow signal, so that the transfer of erroneous data bytes from the data latch to a page of the memory cell array is prevented.

15 Claims, 4 Drawing Sheets

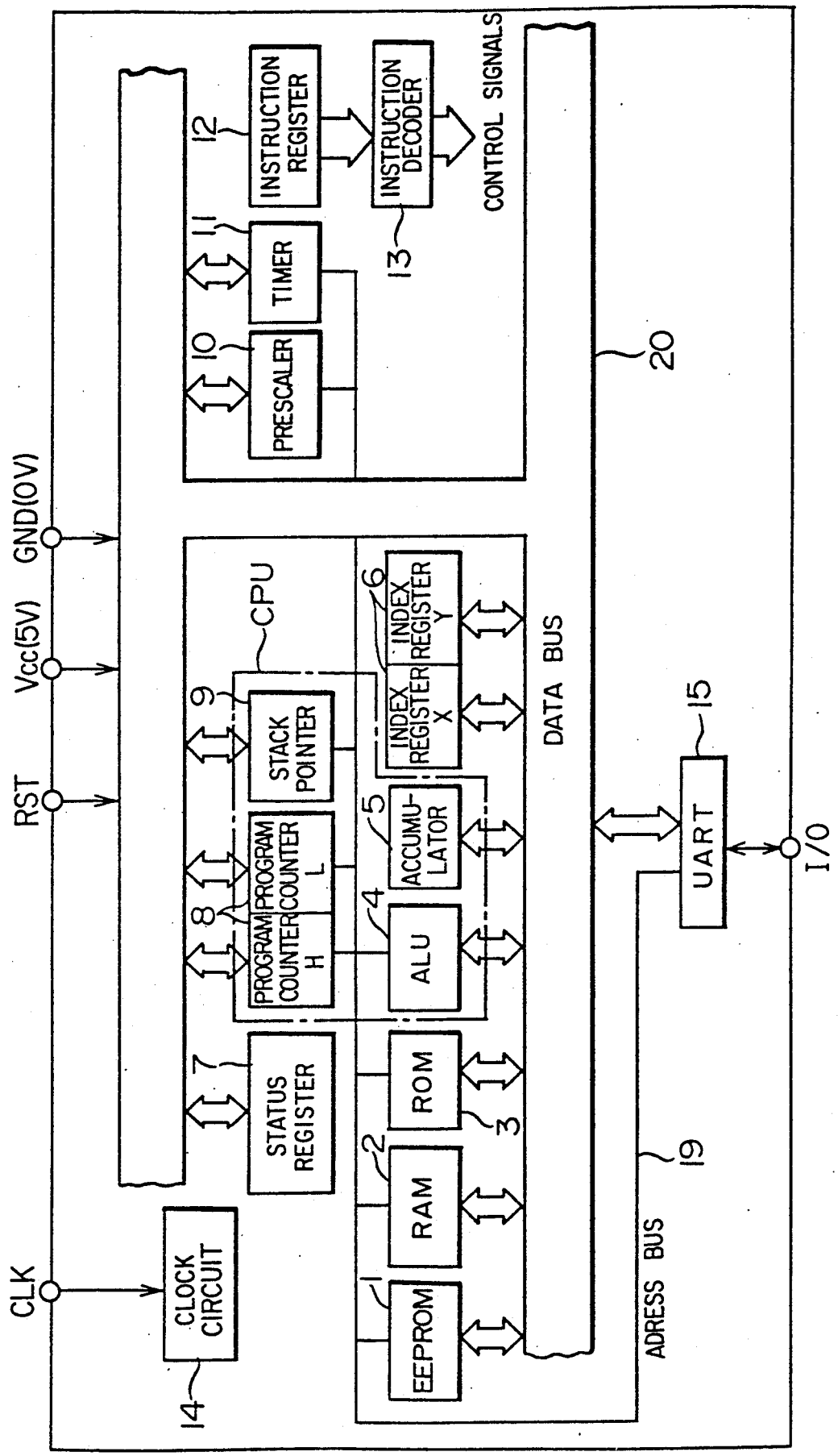

MICROPROCESSOR HAVING MISWRITING PREVENTING FUNCTION

BACKGROUND OF THE INVENTION

1. Field of the Invention

The present invention relates to microprocessor systems comprising a memory which includes means for effecting page mode data writing and, and more particularly, to such microprocessor systems for incorporation in an integrated circuit embedded in a plastic card which is used, for example, for personal identification with an ATM (automatic teller machine), wherein the memory is preferred to be an EEPROM (electrically erasable and programmable read-only memory).

2. Description of the Prior

Recently, IC (integrated circuit) cards, i.e., plastic cards incorporating an IC chip or chips for storing information which are utilized, for example, for personal identification with an ATM, are becoming widely used. Among them, those incorporating a microprocessor and a PROM (programmable read-only memory), or an EEPROM (electrically erasable and programmable read-only memory) in particular, are attracting wide attention because non-volatile data can be written into them without detaching the memory from the circuitry. The speed of writing data into such a memory can be enhanced considerably by adopting the page mode of writing in which a plurality of bytes are written into a page, i.e., a block of byte locations in the memory cell array, in one write cycle of the microprocessor. In other words, the memory cell array is divided into pages each consisting of a same number of bytes, each byte consisting, for example, of 8 bits.

The conventional page mode of writing data into a PROM is effected as follows. First, in a so-called exterior writing operation, a sequence of the data bytes corresponding to a page of the memory cell array is latched in a data latch within the PROM circuit. Next, after the latching of all the data bytes corresponding to a page is finished, a so-called interior writing operation is effected. Namely, the data bytes are transferred from the data latch t byte locations having corresponding addresses in a page of the memory cell array.

Generally, two methods are used today to switch from the exterior writing to the interior writing operation. According to the first of the two methods, a sequence of consecutive data bytes 1 through N are latched in the data latch of the PROM during a predetermined fixed length time interval Tewc measured from the time point at which the latching of the first byte (byte 1) of the sequence is commenced, as shown in FIG. 1. Then, at the end of the time interval Tewc, the PROM automatically switches from the exterior to the interior write operation, to finish one write cycle consisting of an exterior and an interior write cycle Tewc and Tiwc. According to the second method, a maximum or an upper limit Tewcmax is set with respect to the time interval Tewc during which the data bytes are latched in the data latch, and the PROM automatically switches from the exterior to the interior writing operation when the time interval Tewc exceeds the predetermined upper limit Tewcmax.

Conventional devices as described above have following disadvantages. Namely, an operation may be performed which is apparently the writing of data, but is the writing of erroneous data into a PROM which has a page mode writing function. The error may be due, for example, to bad contact of the I/O of the IC card and the ATM terminal, a malfunction of the CPU, or an uncontrolled running of a program in the CPU. In any event, the data latched in the data latch are automatically written into the interior memory cell array.

SUMMARY OF THE INVENTION

Thus, a main object of the present invention is to provide a microprocessor system for incorporation in an IC card which is free from the above-mentioned disadvantage of conventional devices. That is, the present invention aims at providing a microprocessor system that prevents a PROM from switching from the exterior to the interior writing operation when an apparent writing operation including erroneous data is provided to a PROM having a page mode writing function. The present invention also aims at providing a memory circuit having such a miswriting prevention function which may be part of a microprocessor system.

According to a first aspect of the present invention, a microprocessor system for incorporation in an IC card is provided. The system comprises: a CPU; a memory cell array which preferably comprises an EEPROM and which is divided into pages each having a predetermined number of bytes; a data latch for latching data bytes; a data bus for transmitting data bytes to the data latch; an exterior write control circuit including a data latch enabling means for enabling the data latch in response to a signal from the CPU so that a sequence of the predetermined number of bytes transmitted through the data bus is latched in the data latch; and an interior write control circuit which enables the memory cell array to receive the data bytes from the data latch. According to the present invention, the exterior write control circuit further includes a time measurement means and an interior write suppression means. The time measurement means measures the time length which elapses from the time at which the latching of a sequence of the predetermined number of bytes into the data latch is initiated, and outputs an overflow signal when the time length exceeds a predetermined, fixed maximum limit. The interior write suppression means suppresses the interior write control circuit, in response to the signal outputted from the time measurement means, so that the transfer of erroneous data bytes in the data latch to a page of the memory cell array is prevented.

According to a second aspect of the present invention, a memory circuit adapted to form part of such a microprocessor system is provided.

BRIEF DESCRIPTION OF THE DRAWINGS

FIG. 2 is a block diagram showing the layout of a microprocessor system according to the present invention;

In the drawings, like reference numerals represent like or corresponding parts or portions.

DETAILED DESCRIPTION OF THE PREFERRED EMBODIMENTS

Figure 1:
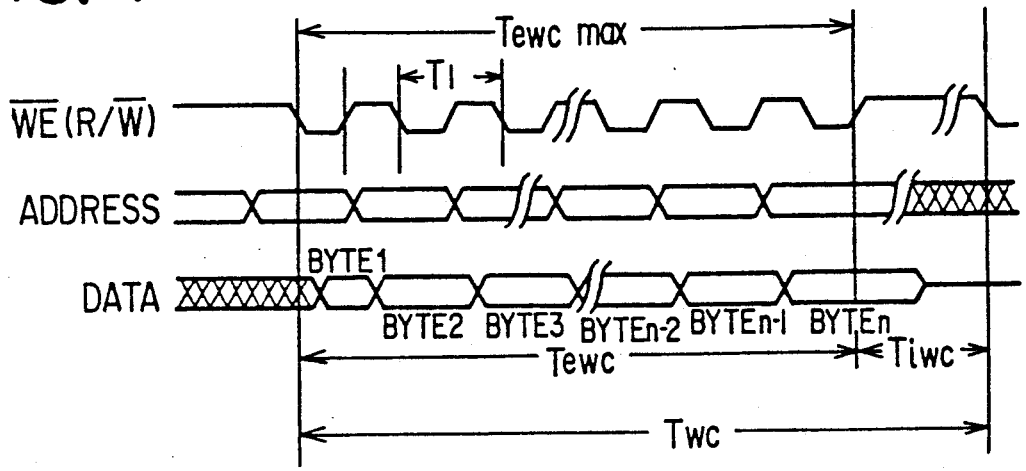
FIG. 1 is a timing chart showing the waveforms of signals occurring in conventional microprocessor systems comprising a PROM having a page mode writing function.

Referring now to FIGS. 2 through 5 of the drawings, a first embodiment according to the present invention is described.

FIG. 2 shows the layout of a microprocessor system formed by an integrated circuit that may be embedded in a resinous card, which may be utilized as a portable memory medium for personal identification with an ATM (automatic teller machine). The whole system may be incorporated in a single IC (Integrated circuit) chip.

The main memory of the system comprises: an EEPROM (electrically erasable and programmable read-only memory) 1, which includes a circuit for preventing miswriting data thereinto according to the present invention, which is described in further detail hereinbelow; a RAM (random access memory) 2 of for storing a large number of bytes, each byte consisting of 8 bits; and a ROM (read-only memory) 3 for storing a large number of bytes.

The CPU (central processing unit) of the system comprises: ALU (arithmetic and logic unit) 4 for effecting parallel 8 bit arithmetical and logical operations; an accumulator 5, i.e., a special register for effecting the addition operation and for storing the result thereof; a pair of index registers X and Y, generally denoted by 6, for storing bits which are utilized in modifying the address of instructions in the indexed addressing mode; a processor status register 7 for storing the results of an arithmetic-logic operation, i.e., the bits indicating carry, zero, negative, etc., of an operation; a pair of higher-order (H) and lower-order (L) program counters 8, each consisting of a 8 bit register, which together indicate the location of the next instruction in the program which is to be executed; a stack pointer 9 which points to the address of the topmost data in a stack (a last-in, first-out memory area, i.e., a set of consecutive locations in a main memory in which data are stored and from which data are taken out by a last-in, first-out principle); a timer 11 for providing clock signals within the CPU; a prescaler 10 for the timer; an instruction register 12 for storing the address of the current instruction; and an instruction decoder 13 for decoding the current instruction stored in the instruction register 12, and for outputting control signals, such as read/write signals R/$\overline{\text{W}}$.

The microprocessor system further comprises a clock circuit 14, and a UART (universal asynchronous receiver transmitter) 15, which is interposed between the input/output I/O and the address and the data buses 19 and 20, for converting address and data transmission from serial to parallel and parallel to serial forms. The address bus 19 is a unidirectional parallel 16 bit bus for forwarding 16 bits of address information from the CPU to the main memory or the UART 15 of the system; the data bus 20 is a bidirectional 8 bit bus for transmitting 8 parallel bits of data and operation codes from the CPU to the memory and to the UART and from the memory and from the UART 15 to the CPU.

The circuitry shown in FIG. 2 is conventional except for the EEPROM 1, which is described in greater detail below.

Figure 3:
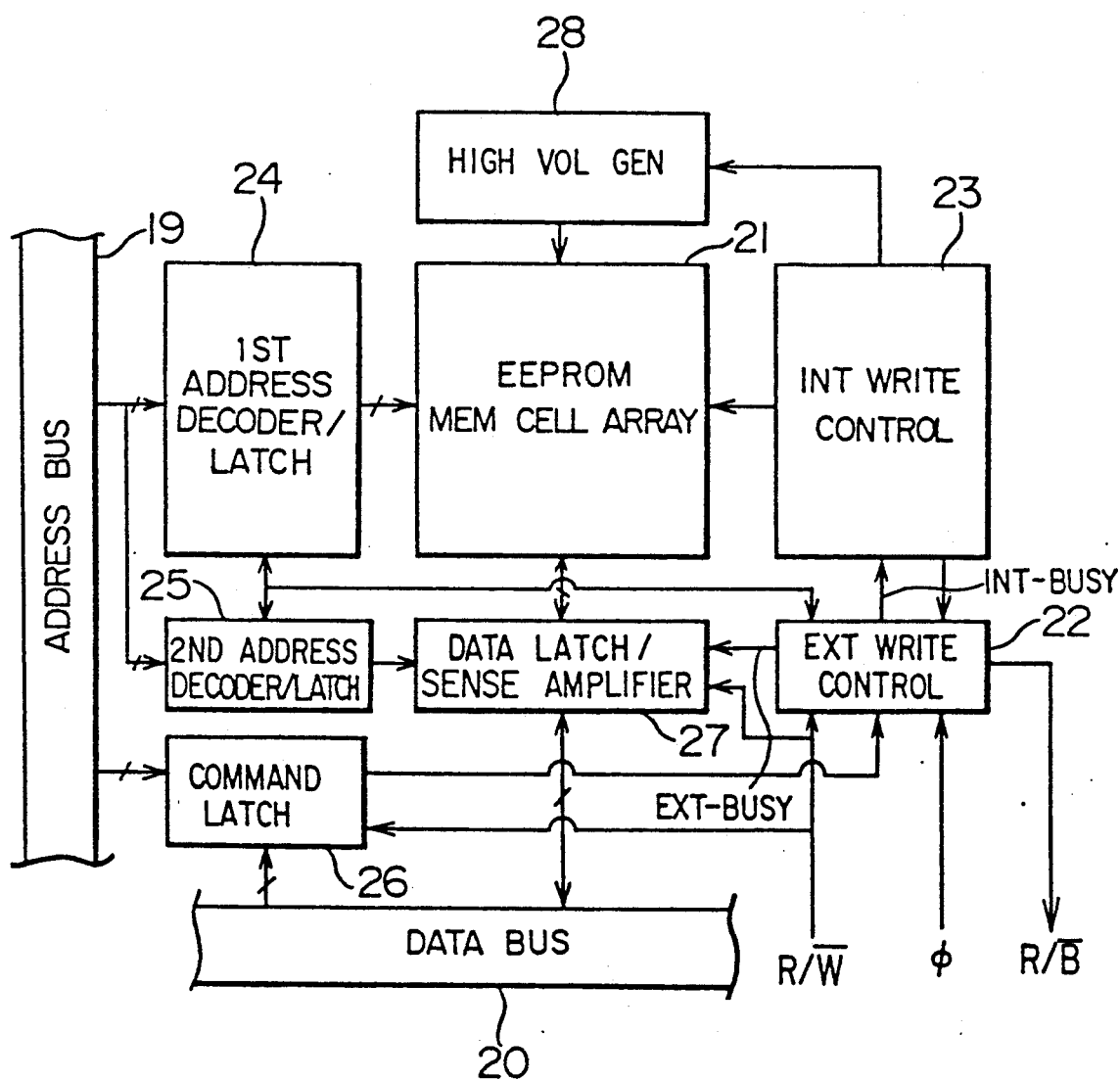
FIG. 3 is a block diagram showing the details of the EEPROM comprised in the microprocessor system of FIG. 2.

FIG. 3 shows the details of the EEPROM 1 of FIG. 2. The central portion of the EEPROM 1 comprises an EEPROM memory cell array 21 including of nonvolatile memory cells into which new data can be written by electrical means, i.e., by the application of a high voltage generated by a high voltage generation circuit 28. The memory cell array 21, which in itself is conventional, is divided into a plurality M of pages, each page consisting of the same number N of bytes. The byte in this microprocessor system consists of 8 bits, as mentioned above. Each byte location in the memory cell array 21 has an address consisting of m+n bits; the first m bits indicate the page in which the byte is located, and the remaining n bits indicate the location within the page. Thus, the numbers M and N are equal to the m-th and n-th power of 2, respectively: $M=2^m$, $N=2^n$.

The 16 address bits transmitted in parallel through the address bus 19 to EEPROM 1 are decoded by the first address decoder/latch 24 into m bits indicating the page in the memory cell array 21, and the obtained m bits are latched therein to be outputted therefrom to the memory array cell 21. The second address decoder/latch 25, on the other hand, produces n bits indicating the location in the page, upon receiving the 16 address bits from the address bus 19; the n bits thus obtained are latched therein to be output therefrom to the data latch/sense amplifier 27. Thus, the sum m+n of the numbers m and n is smaller than the number of bits 16 of the address bus 19. The data latch/sense amplifier 27 comprises, in addition to a sense amplifier for amplifying the data bit signals, registers for storing a set of bytes corresponding to a page in the memory cell array 21. Thus, when a page-mode writing operation writing data into the EEPROM 1 is performed, a sequence of n bytes transmitted through the data bus 20 can be latched, i.e., temporarily stored, in the data latch/sense amplifier 27 before being transferred therefrom to the memory cell array 21. Each byte in the sequence of n bytes is stored at a location indicated by the output of the second address decoder/latch 25.

The page-mode writing operation is divided into exterior and interior writing operations, which are controlled by the exterior write control circuit 22 and the interior write control circuit 23, respectively. The writing operation is performed in response to the commands and control signals from the CPU. The command latch 26 of the EEPROM 1 has its own address, and when the CPU outputs a command to the EEPROM 1 through the data bus 20 with a set of associated address bits for the latch 26 through the address bus 19, the command latch 26 interprets the command and outputs a corresponding signal to the exterior write control circuit 22.

The exterior writing operation in the EEPROM 1 is performed as follows.

Figure 4:
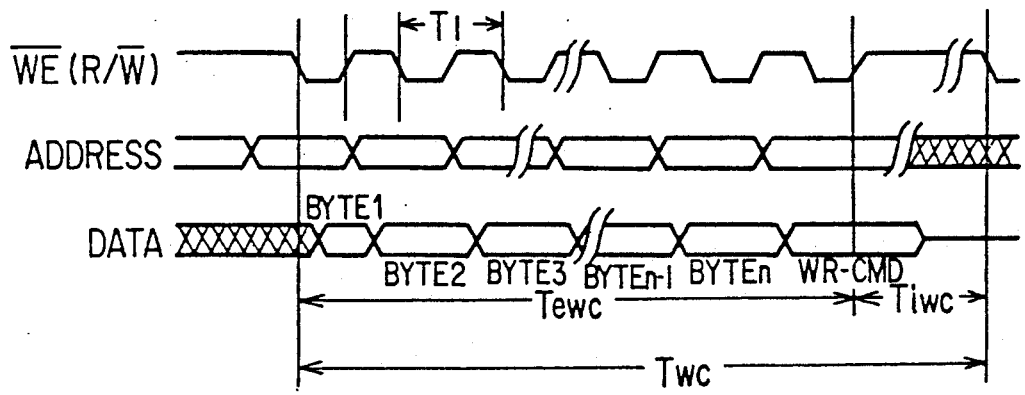
FIG. 4 is a timing chart showing the waveforms of signals occurring in the microprocessor system of FIG. 2.

FIG. 4 shows the waveforms of signals occurring in the circuitry of FIG. 3 in one mode of the exterior writing operation according to the present invention. The read/write signal R/$\overline{\text{W}}$ output from the CPU to the exterior write control circuit 22 has a generally rectangular waveform of a fixed period T1, the low level L of the signal R/$\overline{\text{W}}$ corresponding to the writing periods, as shown at the top of FIG. 4. The data bytes 1 through N, which are shown at the bottom of FIG. 4 in a schematic form by a sequence of N squares, each one of which represents 8 parallel bits, are transmitted successively through the data bus 20 from an external device to the data latch/sense amplifier 27. A sequence of N sets of address bits, which is shown in a schematic form by a sequence of squares at the middle of FIG. 4, is transmitted through the address bus 19 from an external device to the first and second address decoders/latches 24 and 25, wherein each set of the address bits consists of 16 parallel bits which indicate the memory location of an associated data byte.

In an exterior writing operation in page mode writing into the EEPROM of FIG. 3 utilizing the signals shown in FIG. 4, the exterior write control circuit 22 is first enabled in response to a command from the CPU, the command being interpreted by the command latch 26 and supplied therefrom to the exterior write control circuit 22. Then, when the first low level L of the read/write signal R/$\overline{W}$ arrives at the exterior write control circuit 22, which is already enabled by the abovementioned command signal from the command latch 26, the exterior write control circuit 22 outputs an exterior write control signal EXT-BUSY to the data latch/sense amplifier 27. The data latch/sense amplifier 27, in response to the signal EXT-BUSY, latches the data bytes 1 through N at those time intervals in which the read/write signal R/$\overline{W}$ inputted thereto is at the low level L, wherein the locations of the data bytes therein are determined by the bits supplied from the second address decoder/latch 25. Thus, each data byte is latched in the data latch/sense amplifier 27 in a location indicated by an address bit set at the same low level interval of the read/write signal R/$\overline{W}$ as the data byte.

In normal operation, an interior write cycle Tiwc follows the exterior write cycle Tewc, when the bytes 1 through N which are to be stored within a page of the memory cell array 21 are latched in the data latch/sense amplifier 27 and a write command WR-CMD is output from the CPU to the command latch 26 at the end of the exterior write cycle Tewc, as shown in the bottom waveform of FIG. 4. Namely, in response to the command signal corresponding to the signal WR-CMD from the command latch 26, the exterior write control circuit 22 outputs an interior write control signal INT-BUSY to the interior write control circuit 23. As a result, the interior write control circuit 23 enables the memory cell array 21 so that the bytes 1 through N latched in the data latch/sense amplifier 27 are transferred to the page indicated by the bits supplied from the first decoder/latch 24, the locations of the bytes within the page being determined by the locations thereof within the data latch/sense amplifier 27. Thus, a whole write cycle Twc consisting of the exterior write cycle Tewc and the interior write cycle Tiwc is completed. Write cycles Twc are repeated to store multiple pages of data in the memory cell array 21. A ready/busy signal R/$\overline{B}$ is output from the exterior write control circuit 22 to the CPU to indicate indicates whether a writing operation (including the interior as well as the exterior writing operation) is being performed in the EEPROM or not.

According to the present invention, the exterior write control circuit 22 comprises means which suppresses the interior write control signal INT-BUSY if the time required to complete the exterior write cycle Tewc exceeds a predetermined fixed value. More precisely, the signal INT-BUSY is suppressed by the exterior write control circuit 22 if the time which elapses from the beginning of the exterior writing cycle Tewc to the time point at which the transmission of all the bytes 1 through N to be stored within a single page of the memory cell array 21 is completed, exceeds a predetermined fixed maximum time length. Thus, the exterior write control circuit 22 comprises a counter which starts the counting of the number of clock pulses $\phi$ supplied thereto at the time at which an exterior write cycle Tewc begins. If the number counted clock pulses $\phi$ exceeds a predetermined upper limit during the time in which an exterior writing operation is performed, the outputting of the interior write control signal INT-BUSY to the interior write control circuit 23 is suppressed, thereby preventing the transfer of the bytes in the data latch/sense amplifier 27 into the memory cell array 21.

Figure 5:
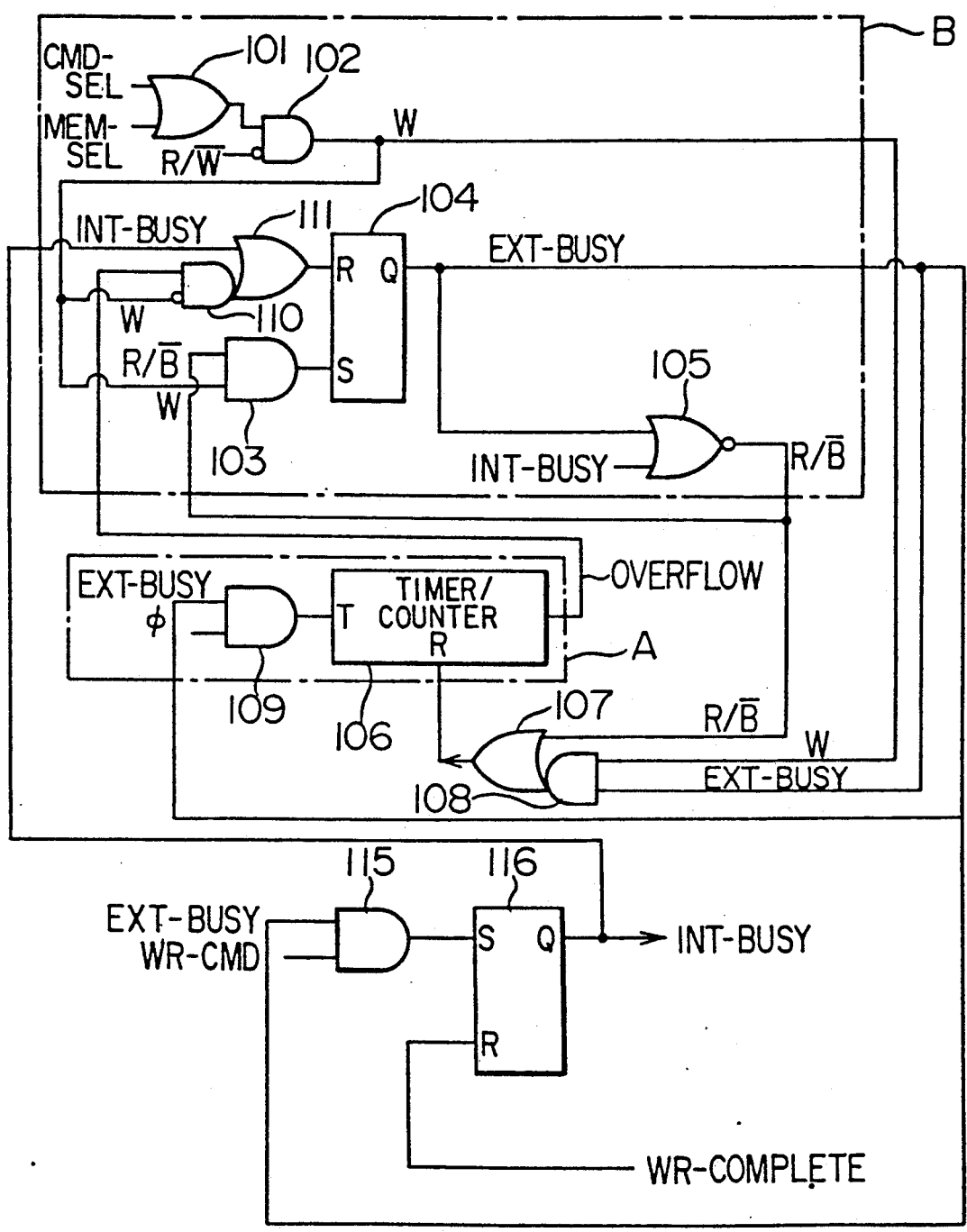
FIG. 5 is a logical circuit diagram of an implementation of the exterior write control circuit incorporated in the EEPROM of FIG. 3.

FIG. 5 shows an implementation of the exterior write control circuit 22 of FIG. 4. The circuitry shown in FIG. 5 comprises a first circuit section A for measuring the time which elapses from the beginning of the exterior write cycle Tewc, and a second circuit section B which outputs the external write control signal EXT-BUSY. The second circuit section B switches the signal EXT-BUSY to the low level L (logical 0) to interrupt the exterior writing operation in response to an overflow signal outputted from the first circuit section A. When the signal EXT-BUSY is the low level L, the generation of the interior write control signal INT-BUSY is suppressed, as explained in detail below. In the logical circuit of FIG. 5, the high level H of signals corresponds to the logical 1, and the low level L thereof to the logical 0.

The second circuit section B of the exterior write control circuit comprises an OR gate 101 into which an interior write select signal CMD-SEL and a memory select signal MEM-SEL are input from outside the exterior write control circuit 22, i.e., from the command latch 26. The interior write select signal CMD-SEL and the memory select signal MEM-SEL are output by the command latch 26 in response to the commands which are output from the CPU at the time points at which the interior and the exterior write operation are to be initiated, respectively. An AND gate 102, supplied with the output of the OR gate 101 and the inversion of the read/write signal R/$\overline{W}$, outputs a pulse signal W:

$$W = (CMD\text{-}SEL + MEM\text{-}SEL) \cdot \overline{R/\overline{W}}. \qquad (1)$$

Thus, the pulse signal W is a signal which is output, i.e., raised to the high level H, when either an exterior or an interior writing operation is initiated, that is, when either the signal MEM-SEL or CMD-SEL is input to the OR gate 101 and the read/write signal R/$\overline{W}$ is at the low level L. The second circuit section B further comprises an R-S flip-flop 104 for outputting the exterior write control signal EXT-BUSY. The reset input R and the set input S of the flip-flop 104 are fed by the combination of an AND gate 110, and an OR gate 111 and by an AND gate 103 respectively, which receive the signals INT-BUSY, OVERFLOW (which is output from the timer/counter 106 of the first circuit section A as explained below), W, and R/$\overline{B}$, as shown in FIG. 5. Namely, $$(R\ input) = INT\text{-}BUSY + (OVERFLOW \cdot \overline{W}), \text{ and} \qquad (2)$$

$$(S\ input) = \overline{R/\overline{B}} \cdot W \qquad (3)$$

Further, the NOR gate 105 of the second circuit section B forms the ready/busy signal R/B̄ from the signals EXT-BUSY and INT-BUSY:

$$R/\overline{B} = \text{EXT-BUSY} + \text{INT-BUSY} \quad (4)$$

The first circuit section A of the exterior write control circuit comprises an AND gate 109 and a timer/counter 106 having an input T coupled to the output of the AND gate 109. The AND gate 109 receives the signal EXT-BUSY and the clock pulse signal $\phi$, and outputs clock pulses $\phi$ during the time in which the signal EXT-BUSY is at the high level H. Thus, the input T of the timer/counter 106 is given as follows:

$$(T \text{ input}) = \text{EXT-BUSY} \cdot \phi \quad (5)$$

The timer/counter 106 counts the number of clock pulses $\phi$ supplied from the AND gate 109, and outputs an overflow signal OVERFLOW when the number of counts exceeds a predetermined fixed number. The reset input R of the timer/counter 106 is supplied by an AND gate 108 and an OR gate 107 which receive the signals R/B̄, W and EXT-BUSY, as shown in FIG. 5:

$$(R \text{ input}) = R/\overline{B} + (W \cdot \text{EXT-BUSY}) \quad (6)$$

The interior write control signal INT-BUSY is output from an R-S flip-flop 116. The set input terminal S of the flip-flop 116 is coupled to the output of an AND gate 115 having two inputs EXP-BTSY and WR-CMD. Thus, the set input S of the flip-flop 116 is given as follows:

$$(S \text{ input}) = \text{EXT-BUSY} \cdot \text{WR-CMD} \quad (7)$$

wherein the signal WR-CMD is output from the command latch 26 in response to a write command from the CPU. The reset input R of the flip-flop 116 is formed by a write complete signal WR-COMPLETE, which is output from the interior write control circuit 23 when the interior writing, i.e., the transfer of the contents of the data latch/sense amplifier 27 into a page of the memory cell array 21, is completed.

The operation of the logical circuit of FIG. 5 is as follows.

When neither exterior or an interior writing is being performed, both the exterior and interior write control signals EXT-BUSY and INT-BUSY are at low levels L. Thus, these signals EXT-BUSY and INT-BUSY are at low levels L at the initial state, at which the CPU initiates the writing of data into the EEPROM of FIG. 3. As a result, the ready/busy signal R/B̄ formed by the OR gate 105 according to equation (4) above is at the high level H (logical 1) at the initial state.

At the first stage of the exterior writing operation, a pulse signal W is output from the AND gate 102 as follows. Namely, the memory select signal MEM-SEL input to the second input terminal of the OR gate 101 rises to the high level H so that the output of the OR gate changes to the high level H. Thus, when the first low level L of the read/write signal R/W̄ occurs, the output W of the AND gate 102, which is given by equation (1) above, rises to the high level H, and returns to the low level L when the read/write signal R/W̄ rises to the high level H.

In response to the generation of the pulse signal W, an exterior write control signal EXT-BUSY is output from the flip-flop 104 as follows. The first input terminal of the AND gate 103 is supplied with the ready/busy signal R/B̄, which is at the high level H at this initial stage as explained above. Further, the second input terminal of the AND gate 103 is supplied with the pulse signal W which is at the high level H as explained above. Thus, the output of the AND gate 103, given by equation (3) above, rises to the high level H to set the flip-flop 104. Thus, the Q output of the flip-flop 104, namely, the signal EXT-BUSY, rises to the high level H. Then, the output of the NOR gate 105, namely the ready/busy signal R/B̄, given by equation (4) above, is reduced to the low level L.

The content of the timer/counter 106 is zero before the writing operation is commenced, because the high level H of the ready/busy signal R/B̄, at which the signal R/B̄ remains before the commencement of the writing operation, resets the timer/counter 106 according to equation (6) above. When the exterior write control signal EXT-BUSY is output from the flip-flop 104 at this initial stage, the AND gate 109 begins to supply the clock signals $\phi$ to the input T of the timer/counter 106 according to equation (5) above. Consequently, the timer/counter 106 begins to count the number of clock pulses $\phi$, and outputs an overflow signal OVERFLOW when the number of counted clock pulses $\phi$ exceeds a predetermined fixed maximum limit.

If the exterior writing is effected normally, the exterior writing operation is succeeded by the interior writing operation. Thus, an interior write select signal CMD-SEL and a write command signal WR-CMD are input to the OR gate 101 and the AND gate 115, respectively, at the time when latching of the data bytes 1 through N into the data latch/sense amplifier 27 is completed. As a result, the pulse signal W is output from the AND gate 102 at the first low level L of the read/write signal R/W̄ according to equation (1) above, and the flip-flop 116 is set according to equation (7) above. Thus, the timer/counter 106 is reset in response to the generation of the pulse signal W according to equation (6) above, and the flip-flop 116 outputs the interior write control signal INT-BUSY. Hence, the interior writing operation is commenced by the interior write control circuit 23. At the same time, the flip-flop 104 is reset by the signal INT-BUSY according to equation (2) above, and the signal EXT-BUSY returns to the low level L. Thus, the clock pulse output of the AND gate 109 ceases according to equation (5) above, and the counting of the clock pulses by the timer/counter 106 is stopped during the interior writing operation.

When the interior writing operation as described above is completed, the write complete signal WR-COMPLETE is inputted to the reset terminal R of the flip-flop 116 and the signal INT-BUSY returns to the low level L. Thus, the ready/busy signal R/B̄ rises to the high level H according to equation (4) above, thereby completing the whole writing cycle Twc.

If the exterior writing operation is abnormal, the timer/counter 106 outputs an overflow signal OVERFLOW before the signals CMD-SEL and WR-CMD are input to the gates 101 and 115, respectively. In such a case, the generation of the high level H of the overflow signal OVERFLOW resets the flip-flop 104 according to equation (2) above, so that the exterior write control signal EXT-BUSY returns to the low level L. Thus, the low level L of the signal EXT-BUSY suppresses the generation of the interior write control signal INT-BUSY according to equation (7) above. Namely, the signal INT-BUSY is not output from the flip-flop 116, even when the signal WR-CMD is input to the AND gate 115, and the transfer of the erroneous data bytes from the data latch/sense amplifier 27 to the memory cell array 21 is prevented. When the signal EXT-BUSY returns to the low level L, the ready/busy signal R/$\overline{B}$ rises to the high level H according to equation (4) above, to reset the timer/counter 106. Thus, the EEPROM 1 returns to its initial state, and is ready to receive data for writing into the memory cell array 21.

Figure 6:
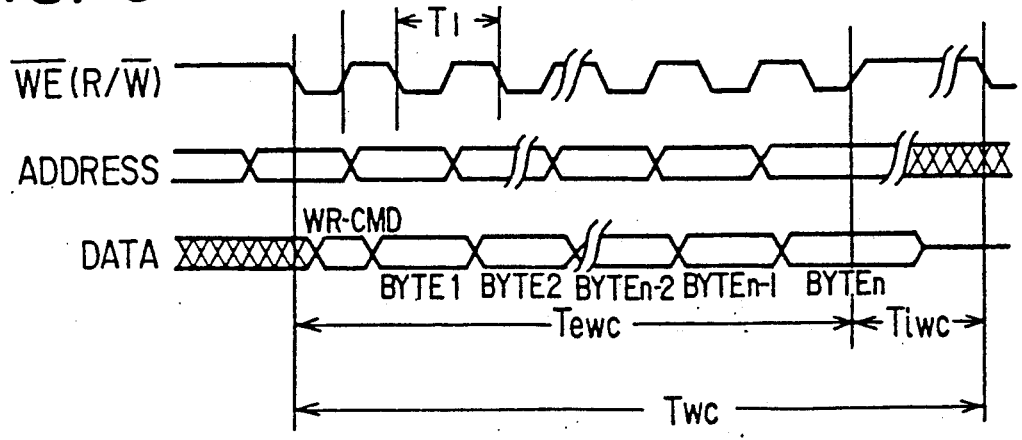
FIG. 6 is a timing chart of the waveforms of signals which may be utilized in another embodiment according to the present invention.

In the first embodiment described above, the write command WR-CMD is supplied from the CPU at the end of each exterior write cycle Tewc, as shown in FIG. 4. However, it is possible to supply the write command WR-CMD at the beginning of each exterior write cycle Tewc before the data bytes 1 through N are latched in the exterior writing operation, as shown in FIG. 6. Further, it is also possible to omit supplying the write command by pre-setting the number of the bytes which are to be latched in each exterior write cycle.

What is claimed is:

1. A microprocessor system for incorporation in an IC card comprising:
   a central processing unit;
   a data bus in communication with said central processing unit for transfer of data bytes;
   a memory cell array for storing data, said array being divided into a plurality of memory area pages, each page having a predetermined byte storage capacity;
   data latch means connected to said memory cell array and in communication with said data bus for temporarily storing, in response to an enable signal, a number of bytes equal to the predetermined byte storage capacity of a page, received from said data bus, prior to storing the bytes in said memory cell array;
   data latch enabling means connected to said data latch means and said central processing unit for enabling said data latch means, in response to an enable signal generated by said central processing unit, to temporarily store bytes received from said data bus;
   interior write means, connected to said data latch enabling means, and said memory cell array, for transferring, in response to a write command signal generated by said central processing unit, from said data latch means, bytes temporarily stored in said data latch means to a page of said memory cell array;
   time measurement means for measuring the time which elapses from generation of an enable signal by said central processing unit and while said data latch means receives from said data bus and temporarily stores a number of bytes equal to the predetermined byte storage capacity of a page in said data latch means, said time measurement means comprising overflow signal generating means for generating an overflow signal when the time measured by said time measurement means exceeds a predetermined limit; and
   interior write suppression means connected to said interior write means and said time measurement means for preventing said interior write means, in response to generation of said overflow signal, from transferring bytes temporarily stored in said data latch means from said data latch means to said memory cell array.

2. A microprocessor system as claimed in claim 1 wherein said memory cell array comprises an electrically erasable and programmable read-only memory cell array.

3. A microprocessor system as claimed in claim 1 comprising:
   an address bus for transmitting data bits corresponding to an address of a byte location in said memory cell array;
   first address decoder means connected to said memory cell array and in communication with said address bus for decoding data bits received through said address bus into an address of a page in said memory cell array; and
   second address decoder means connected to said data latch means and in communication with said address bus for decoding data bits received through said address bus into an address of a data byte within a page of said memory cell array.

4. A microprocessor system as claimed in claim 1 wherein said time measurement means comprises a clock pulse generator for generating clock pulses, a counter for counting the clock pulses generated by said clock pulse generator.

5. The microprocessor system as claimed in claim 1 wherein said data latch enabling means comprises means for disabling said data latch means in response to said overflow signal to stop temporarily storing bytes received from said data bus in said data latch means.

6. The microprocessor system as claimed in claim 3 wherein said data latch enabling means comprises means for disabling said data latch means in response to said overflow signal to stop temporarily storing bytes received from said data bus in said data latch means.

7. The microprocessor system as claimed in claim 4 wherein said data latch enabling means comprises means for disabling said data latch means in response to said overflow signal to stop temporarily storing bytes received from said data bus in said data latch means.

8. A microprocessor system as claimed in claim 1 wherein said data latch enabling means comprises interior write enabling signal means for generating an interior write enabling signal and for enabling said interior write means in response to generation of a command signal by said central processing unit.

9. A microprocessor system as claimed in claim 8 wherein said interior write suppression means comprises means for preventing generation of said interior write enabling signal in response to said overflow signal.

10. A microprocessor system as claimed in claim 8 comprising command latch means for latching the command said generated by said central processing unit.

11. A memory circuit for a microprocessor system comprising:
    a data bus for transferring data bytes;
    a memory cell array for storing data, said array being divided into a plurality of memory area pages, each page having a predetermined byte storage capacity;
    data latch means connected to said memory cell array and in communication with said data bus for temporarily storing, in response to an enable signal, a number of bytes equal to the predetermined byte storage capacity of a page, received from said data bus, prior to storing the bytes in said memory cell array;

data latch enabling means connected to said data latch means for enabling said data latch means, in response to an enable signal, to temporarily store bytes received from said data bus;

interior write means, connected to said data latch enabling means and said memory cell array, for transferring, in response to a write command signal generated by said central processing unit, from said data latch means, bytes temporarily stored in said data latch means to a page of said memory cell array;

time measurement means for measuring the time which elapses from generation of an enable signal and while said data latch means receives from said data bus and temporarily stores a number of bytes equal to the predetermined byte storage capacity of a page in said data latch means, said time measurement means comprising overflow signal generating means for generating an overflow signal when the time measured by said time measurement means exceeds a predetermined limit; and interior write suppression means connected to said interior write means and said time measurement means for preventing said interior write means, in response to generation of said overflow signal, from transferring bytes temporarily stored in said data latch means from said data latch means to said memory cell array.

12. A memory circuit as claimed in claim 11 wherein said memory cell array comprises an electrically erasable and programmable read-only memory cell array.

13. A memory circuit as claimed in claim 11 comprising:

an address bus for transmitting data bits corresponding to an address of a byte location in said memory cell array;

first address decoder means connected to said memory cell array and in communication with said data bus for decoding address bits received through said address bus into an address of a page in said memory cell array; and second address decoder means connected to said data latch means and in communication with said address bus for decoding bits received through said address bus into an address of a data byte within a page of said memory cell array.

14. A memory circuit as claimed in claim 11 wherein said time measurement means comprises a clock pulse generator for generating clock pulses, a counter for counting the clock pulses generated by said clock pulse generator.

15. The microprocessor system as claimed in claim 11 wherein said data latch enabling means comprises means for disabling said data latch means in response to said overflow signal to stop temporarily storing bytes received from said data bus in said data latch means.

* * * * *